(12) United States Patent
Linhardt et al.

(10) Patent No.: US 8,377,464 B2
(45) Date of Patent: *Feb. 19, 2013

(54) POLYMERIZABLE SURFACTANTS AND THEIR USE AS DEVICE FORMING COMONOMERS

(75) Inventors: Jeffrey G. Linhardt, Fairport, NY (US); Daniel M. Ammon, Jr., Webster, NY (US); Joseph C. Salamone, San Antonio, TX (US); Daniel J. Hook, Fairport, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,604

(22) Filed: Feb. 27, 2012

(65) Prior Publication Data

US 2012/0157565 A1 Jun. 21, 2012

Related U.S. Application Data

(63) Continuation of application No. 11/020,541, filed on Dec. 22, 2004, now Pat. No. 8,197,841.

(51) Int. Cl.
*A61F 2/00* (2006.01)

(52) U.S. Cl. .......................... 424/427; 424/428; 424/429

(58) Field of Classification Search ........................ None
See application file for complete search history.

(56) References Cited

U.S. PATENT DOCUMENTS

| | | | |
|---|---|---|---|
| 3,408,429 A | 10/1968 | Wichterle | |
| 3,496,254 A | 2/1970 | Wichterle | |
| 4,032,599 A | 6/1977 | Cordrey | |
| 4,136,250 A | 1/1979 | Mueller et al. | |
| 4,153,641 A | 5/1979 | Deichert et al. | |
| 4,259,467 A | 3/1981 | Keogh et al. | |
| 4,260,725 A | 4/1981 | Keogh et al. | |
| 4,327,203 A | 4/1982 | Deichert et al. | |
| 4,355,147 A | 10/1982 | Deichert et al. | |
| 4,440,918 A | 4/1984 | Rice et al. | |
| 4,463,149 A | 7/1984 | Ellis | |
| 4,604,479 A | 8/1986 | Ellis | |
| 4,652,622 A | 3/1987 | Friends et al. | |
| 4,686,267 A | 8/1987 | Ellis et al. | |
| 4,740,533 A | 4/1988 | Su et al. | |
| 4,810,764 A | 3/1989 | Friends et al. | |
| 4,826,936 A | 5/1989 | Ellis | |
| 4,910,277 A | 3/1990 | Bambury et al. | |
| 4,929,692 A | 5/1990 | Goldenberg | |
| 4,954,587 A | 9/1990 | Mueller | |
| 4,990,582 A | 2/1991 | Salamone | |
| 4,996,275 A | 2/1991 | Ellis et al. | |
| 5,010,141 A | 4/1991 | Mueller | |
| 5,032,658 A | 7/1991 | Baron et al. | |
| 5,034,461 A | 7/1991 | Lai et al. | |
| 5,070,169 A | 12/1991 | Robertson et al. | |
| 5,070,215 A | 12/1991 | Bambury et al. | |
| 5,079,319 A | 1/1992 | Mueller | |
| 5,177,165 A | 1/1993 | Valint, Jr. et al. | |
| 5,177,168 A | 1/1993 | Baron et al. | |
| 5,219,965 A | 6/1993 | Valint, Jr. et al. | |
| 5,260,000 A | 11/1993 | Nandu et al. | |
| 5,270,418 A | 12/1993 | Kunzler et al. | |
| 5,310,779 A | 5/1994 | Lai | |
| 5,321,108 A | 6/1994 | Kunzler et al. | |
| 5,334,681 A | 8/1994 | Mueller et al. | |
| 5,336,797 A | 8/1994 | McGee et al. | |
| 5,346,976 A | 9/1994 | Ellis et al. | |
| 5,358,995 A | 10/1994 | Lai et al. | |
| 5,364,918 A | 11/1994 | Valint, Jr. et al. | |
| 5,387,662 A | 2/1995 | Kunzler et al. | |
| 5,449,729 A | 9/1995 | Lai | |
| 5,512,205 A | 4/1996 | Lai | |
| 5,525,691 A | 6/1996 | Valint, Jr. et al. | |
| 5,610,252 A | 3/1997 | Bambury et al. | |
| 5,616,757 A | 4/1997 | Bambury et al. | |
| 5,708,094 A | 1/1998 | Lai et al. | |
| 5,710,302 A | 1/1998 | Kunzler et al. | |
| 5,714,557 A | 2/1998 | Kunzler et al. | |
| 5,908,906 A | 6/1999 | Kunzler et al. | |
| 5,981,669 A | 11/1999 | Valint, Jr. et al. | |
| 6,316,011 B1 | 11/2001 | Ron et al. | |
| 6,517,933 B1 | 2/2003 | Soane et al. | |
| 2001/0056165 A1 | 12/2001 | Mentak | |
| 2003/0025222 A1* | 2/2003 | Bothe et al. | 264/1.1 |
| 2003/0044468 A1* | 3/2003 | Cellesi et al. | 424/487 |
| 2004/0056371 A1 | 3/2004 | Liao et al. | |
| 2004/0116564 A1 | 6/2004 | Devlin et al. | |
| 2005/0018310 A1 | 1/2005 | Kornfield et al. | |
| 2005/0070688 A1 | 3/2005 | Lewandowski et al. | |

(Continued)

FOREIGN PATENT DOCUMENTS

| | | |
|---|---|---|
| EP | 0395585 B1 | 10/1990 |
| EP | 0406161 B1 | 1/1991 |
| EP | 1308500 A1 | 5/2003 |
| WO | WO 96/20795 A1 | 7/1996 |
| WO | WO 2006/068705 A1 | 6/2006 |

OTHER PUBLICATIONS

Huang et al., "Synthesis and characterization of self-assembling block copolymers containing adhesive moieties," Polymer Preprints, 2001, (vol. 42), (Issue. 2), (p. 147).

Liu et al., "Engineering protein and cell adhesivity using PEO-terminated triblock polymers," J Biomed Mater Res, 2002, (vol. 60), (p. 126-134).

Sigma-Aldrich, "Poly(propylene glycol)-block-polyethylene(glycol)-block-poly(propylene glycol)," Catalog description, www.sigmaaldrich.com, (Apr. 25, 2009).

Warriner et al., "Lamellar biogels: fluid-membrane-based hydrogels containing polymer lipids," Science, (vol. 271), (p. 969-973), (Feb. 16, 1996).

*Primary Examiner* — James Rogers (74) *Attorney, Agent, or Firm* — Glenn D. Smith; M. Carmen & AAssociates, PLLC (57) ABSTRACT

This invention describes the use of polymerizable surfactants as comonomers in forming ophthalmic devices such as contact lenses, intraocular lenses, corneal implants, etc.

3 Claims, 9 Drawing Sheets

U.S. PATENT DOCUMENTS

| | | |
|---|---|---|
| 2005/0202986 A1 | 9/2005 | Hu et al. |
| 2006/0134169 A1 | 6/2006 | Linhardt et al. |
| 2006/0275342 A1 | 12/2006 | Lindhardt et al. |
| 2007/0120279 A1 | 5/2007 | Linhardt et al. |

* cited by examiner

1% Methacrylated Reverse Pluronics in formulation of Example #6

1% Methacrylated Reverse Tetronics in formulation of Example #6
and control homopolymers of PEO-DM and PPO-DM

POLYMERIZABLE SURFACTANTS AND THEIR USE AS DEVICE FORMING COMONOMERS

REFERENCE TO RELATED APPLICATIONS

This application is a Continuation of co-pending U.S. patent application Ser. No. 11/020,541, filed Dec. 22, 2004, herein incorporated by reference.

FIELD

This invention describes the use of polymerizable poloxamers and poloxamines as comonomers in forming polymeric devices such as contact lenses, intraocular lenses, biofilters, etc.

BACKGROUND

Poloxamer block copolymers are known compounds and are generally available under the trademark PLURONIC. Poloxamers generally have the following general formula:

$$HO(C_2H_4O)_a(C_3H_6O)_b(C_2H_4O)_aH$$

Reverse poloxamers are also known block copolymers and generally have the following general formula:

$$HO(C_3H_6O)_b(C_2H_4O)_a(C_3H_6O)_bH$$

wherein a and b are of varying lengths.

Poloxamers and reverse poloxamers have end terminal hydroxyl groups that can be functionalized. An example of an end terminal functionalized poloxamer is poloxamer dimethacrylate (Pluronic F-127 dimethacrylate) as disclosed in US Patent Publication No. 2003/0044468 to Cellesi et al. U.S. Pat. No. 6,517,933 discloses glycidyl-terminated copolymers of polyethylene glycol and polypropylene glycol.

Poloxamers and reverse poloxamers are surfactants with varying HLB values based upon the varying values of a and b, a representing the number of hydrophilic poly(ethylene oxide) units (PEO) being present in the molecule and b representing the number of hydrophobic poly(propylene oxide) units (PPO) being present in the molecule. While poloxamers and reverse poloxamers are considered to be difunctional molecules (based on the terminal hydroxyl groups) they are also available in a tetrafunctional form known as poloxamines, trade name TETRONIC. For poloxamines, the molecules are tetrafunctional block copolymers terminating in primary hydroxyl groups and linked by a central diamine. Poloxamines have the following general structure:

Reverse poloxamines are also known and have varying HLB values based upon the relative ratios of a to b.

Polyethers that are present at the surface of substrates have long been known to inhibit bacterial adhesion and to reduce the amount of lipid and protein deposition (non-fouling surface). In the present invention, we chemically modify poloxamer and poloxamine block copolymers (BASF Corp.) and include them in ophthalmic device forming formulations.

Medical devices such as ophthalmic lenses can generally be subdivided into two major classes, namely hydrogels and non-hydrogels. Non-hydrogels do not absorb appreciable amounts of water, whereas hydrogels can absorb and retain water in an equilibrium state.

Hydrogels are widely used as soft contact lens materials. It is known that increasing the hydrophilicity of the contact lens surface improves the wettability of the contact lenses. This in turn is associated with improved wear comfort of contact lenses. Additionally, the surface of the lens can affect the overall susceptibility of the lens to deposition of proteins and lipids from the tear fluid during lens wear. Accumulated deposits can cause eye discomfort or even inflammation. In the case of extended wear lenses (i.e. lenses used without daily removal of the lens before sleep), the surface is especially important, since extended wear lenses must be designed for high standards of comfort and biocompatibility over an extended period of time. Thus new formulations that have the potential to yield improved surface qualities are still desirable in this field of art.

DETAILED DESCRIPTION

Comonomers and Oligomers

Examples of biomaterials useful in the present invention are taught in U.S. Pat. Nos. 5,908,906 to Kunzler et al.; 5,714,557 to Kunzler et al.; 5,710,302 to Kunzler et al.; 5,708,094 to Lai et al.; 5,616,757 to Bambury et al.; 5,610,252 to Bambury et al.; 5,512,205 to Lai; 5,449,729 to Lai; 5,387,662 to Kunzler et al. and 5,310,779 to Lai; which patents are incorporated by reference as if set forth at length herein.

Rigid gas-permeable (RGP) materials typically comprise a hydrophobic cross-linked polymer system containing less than 5 wt. % water. RGP materials useful in accordance with the present invention include those materials taught in U.S. Pat. Nos. 4,826,936 to Ellis; 4,463,149 to Ellis; 4,604,479 to Ellis; 4,686,267 to Ellis et al.; 4,826,936 to Ellis; 4,996,275 to Ellis et al.; 5,032,658 to Baron et al.; 5,070,215 to Bambury et al.; 5,177,165 to Valint et al.; 5,177,168 to Baron et al.; 5,219,965 to Valint et al.; 5,336,797 to McGee and Valint; 5,358,995 to Lai et al.; 5,364,918 to Valint et al.; 5,610,252 to Bambury et al.; 5,708,094 to Lai et al; and 5,981,669 to Valint et al. U.S. Pat. No. 5,346,976 to Ellis et al. teaches a preferred method of making an RGP material.

The invention is applicable to a wide variety of polymeric materials, either rigid or soft. Especially preferred polymeric materials are lenses including contact lenses, phakic and aphakic intraocular lenses and corneal implants although all polymeric materials including biomaterials are contemplated as being within the scope of this invention. Hydrogels comprise hydrated, crosslinked polymeric systems containing water in an equilibrium state. Such hydrogels could be silicone hydrogels, which generally have water content greater than about five weight percent and more commonly between about ten to about eighty weight percent. Such materials are usually prepared by polymerizing a mixture containing at least one siloxane-containing monomer and at least one hydrophilic monomer. Applicable siloxane-containing monomeric units for use in the formation of silicone hydrogels are well known in the art and numerous examples are provided in U.S. Pat. Nos. 4,136,250; 4,153,641; 4,740,533; 5,034,461; 5,070,215; 5,260,000; 5,310,779; and 5,358,995. Moreover, the use of siloxane-containing monomers having certain fluorinated side groups, i.e. —($CF_2$)—H, have been found to improve compatibility between the hydrophilic and siloxane-containing monomeric units, as described in U.S. Pat. Nos. 5,387,662 and 5,321,108.

Functionalized Surfactants

The poloxamer and/or poloxamine is functionalized to provide the desired reactivity at the end terminal of the molecule. The functionality can be varied and is determined based upon the intended use of the functionalized PEO- and PPO-containing block copolymers. That is, the PEO- and PPO-containing block copolymers are reacted to provide end terminal functionality that is complementary with the intended device forming monomer mixture. By block copolymer we mean to define the poloxamer and/or poloxamine as having two or more blocks in their polymeric backbone(s).

Selection of the functional end group is determined by the functional group of the reactive molecule in the monomer mix. For example, if the reactive molecule contains a carboxylic acid group, glycidyl methacrylate can provide a methacrylate end group. If the reactive molecule contains hydroxy or amino functionality, isocyanato ethyl methacrylate or (meth)acryloyl chloride can provide a methacrylate end group and vinyl chloro formate can provide a vinyl end group. A wide variety of suitable combinations of ethylenically unsaturated end groups and reactive molecules will be apparent to those of ordinary skill in the art. For example, the functional group may comprise a moiety selected from amine, hydrazine, hydrazide, thiol (nucleophilic groups), carboxylic acid, carboxylic ester, including imide ester, orthoester, carbonate, isocyanate, isothiocyanate, aldehyde, ketone, thione, alkenyl, acrylate, methacrylate, acrylamide, sulfone, maleimide, disulfide, iodo, epoxy, sulfonate, thiosulfonate, silane, alkoxysilane, halosilane, and phosphoramidate. More specific examples of these groups include succinimidyl ester or carbonate, imidazolyl ester or carbonate, benzotriazole ester or carbonate, p-nitrophenyl carbonate, vinyl sulfone, chloroethylsulfone, vinylpyridine, pyridyl disulfide, iodoacetamide, glyoxal, dione, mesylate, tosylate, and tresylate. Also included are other activated carboxylic acid derivatives, as well as hydrates or protected derivatives of any of the above moieties (e.g. aldehyde hydrate, hemiacetal, acetal, ketone hydrate, hemiketal, ketal, thioketal, thioacetal). Preferred electrophilic groups include succinimidyl carbonate, succinimidyl ester, maleimide, benzotriazole carbonate, glycidyl ether, imidazoyl ester, p-nitrophenyl carbonate, acrylate, tresylate, aldehyde, and orthopyridyl disulfide.

The foregoing reaction sequences are intended to be illustrative, not limiting. Examples of reaction sequences by which PEO- and PPO-containing block copolymers can be end-functionalized are provided below:

Bis-epoxide

Pluronic F127

NaH
THF

Pluronic bis-epoxide

Dimethacrylate

Pluronic F127

TEA/
THF

Further provided herein are certain exemplary, but non-limiting, examples of reactions for providing functionalized termini for PEO- and PPO-containing block copolymers. It is to be understood that one of ordinary skill in the art would be able to determine other reaction methods without engaging in an undue amount of experimentation. It should also be understood that any particular block copolymer molecule show is only one chain length of a polydispersed population of the referenced material.

PEO- and PPO-containing block copolymers are presently preferred. One such copolymer that can be used with the method of the invention, is Pluronic® F127, a block copolymer having the structure [(polyethylene oxide)$_{99}$-(polypropylene oxide)$_{66}$-(polyethylene oxide)$_{99}$]. The terminal hydroxyl groups of the copolymer are functionalized to allow for the reaction of the copolymer with other device forming monomers.

Device Forming Additives and Comonomers

The polymerizable composition may, further as necessary and within limits not to impair the purpose and effect of the present invention, contain various additives such as antioxidant, coloring agent, ultraviolet absorber and lubricant.

In the present invention, the polymerizable composition may be prepared by using, according to the end-use and the like of the resulting shaped polymer articles, one or at least two of the above comonomers and oligomers and functionalized surfactants: and, when occasions demand, one or more crosslinking agents.

Where the shaped polymer articles are for example medical products, in particular a contact lens, the polymerizable composition is suitably prepared from one or more of the silicon compounds, e.g. siloxanyl (meth)acrylate, siloxanyl (meth)acrylamide and silicone oligomers, to obtain contact lenses with high oxygen permeability.

The monomer mix of the present invention may include additional constituents such as crosslinking agents, internal wetting agents, hydrophilic monomeric units, toughening agents, and other constituents as is well known in the art.

Although not required, compositions within the scope of the present invention may include toughening agents, preferably in quantities of less than about 80 weight percent e.g. about 5 to about 80 weight percent, and more typically from about 20 to about 60 weight percent. Examples of suitable toughening agents are described in U.S. Pat. No. 4,327,203. These agents include cycloalkyl acrylates or methacrylates, such as: methyl acrylate and methacrylate, t-butylcyclohexyl methacrylate, isopropylcyclopentyl acrylate, t-pentylcycloheptyl methacrylate, t-butylcyclohexyl acrylate, isohexylcyclopentyl acrylate and methylisopentyl cyclooctyl acrylate. Additional examples of suitable toughening agents are described in U.S. Pat. No. 4,355,147. This reference describes polycyclic acrylates or methacrylates such as: isobornyl acrylate and methacrylate, dicyclopentadienyl acrylate and methacrylate, adamantyl acrylate and methacrylate, and isopinocamphyl acrylate and methacrylate. Further examples of toughening agents are provided in U.S. Pat. No. 5,270,418. This reference describes branched alkyl hydroxyl cycloalkyl acrylates, methacrylates, acrylamides and methacrylamides. Representative examples include: 4-t-butyl-2-hydroxycyclohexyl methacrylate (TBE);: 4-t-butyl-2-hydroxycyclopentyl methacrylate; methacryloxyamino-4-t-butyl-2-hydroxycyclohexane; 6-isopentyl-3-hydroxycyclohexyl methacrylate; and methacryloxyamino-2-isohexyl-5-hydroxycyclopentane.

Internal wetting agents may also be used for increasing the wettability of such hydrogel compositions. Examples of suitable internal wetting agents include N-alkyenoyl trialkylsilyl aminates as described in U.S. Pat. No. 4,652,622. These agents can be represented by the general formula:

CH$_2$=C(E)C(O)N(H)CH(G)(CH$_2$)$_q$C(O)OSi(V)$_3$ wherein:
E is hydrogen or methyl,
G is (CH$_2$)$_r$C(O)OSi(V)$_3$ or hydrogen,
V is ethyl, ethyl or propyl,
q is an integer form 1 to 15,
r is an integer form 1 to 10,
q+r is an integer form 1 to 15, hereinafter referred to as NATA.

Acryloxy- and methacryloxy-, mono- and dicarboxylic amino acids, hereinafter NAA, impart desirable surface wetting characteristics to polysiloxane polymers, but precipitate out of monomer mixtures that do not contain siloxane monomers before polymerization is completed. NAA can be modified to form trialkylsilyl esters which are more readily incorporated into polysiloxane polymers. The preferred NATAs are trimethylsilyl-N-methacryloxyglutamate, triethylsilyl-N-methacryloxyglutamate, trimethyl-N-methacryloxy-6-aminohexanoate, trimethylsilyl-N-methacryloxy-aminododecanoate, and bis-trimethyl-silyl-N-methacryloxyaspartate.

Preferred wetting agents also include acrylic and methacylic acids, and derivatives thereof. Typically, such wetting agents comprise less than 5 weight percent of the composition.

Other preferred internal wetting agents include oxazolones as described in U.S. Pat. No. 4,810,764 to Friends et al. issued Mar. 7, 1989, the contents of which are incorporated by reference herein. These preferred internal wetting agents specifically include 2-isopropenyl-4,4-dimethyl-2-oxazolin-5-one (IPDMO), 2-vinyl-4,4-dimethyl-2-oxazolin-5-one (VDMO), cyclohexane spiro-4'-(2'isopropenyl-2'-oxazol-5'-one) (IPCO), cyclohexane-spiro-4'-(2'-vinyl-2'-oxazol-5'-one) (VCO), and 2-(–1-propenyl)-4,4-dimethyl-oxazol-5-one (PDMO). The preparation of such oxazolones is known in the art and is described in U.S. Pat. No. 4,810,764.

These preferred internal wetting agents have two important features which make them particularly desirable wetting agents: (1) they are relatively non-polar and are compatible with the hydrophobic monomers (the polysiloxanes and the toughening agents), and (2) they are converted to highly polar amino acids on mild hydrolysis, which impart substantial wetting characteristics. When polymerized in the presence of the other components, a copolymer is formed. These internal wetting agents polymerize through the carbon-carbon double bond with the endcaps of the polysiloxane monomers, and with the toughening agents to form copolymeric materials particularly useful in biomedical devices, especially contact lenses.

As indicated, the subject hydrogel compositions includes hydrophilic monomeric units. Examples of appropriate hydrophilic monomeric units include those described in U.S. Pat. Nos. 4,259,467; 4,260,725; 4,440,918; 4,910,277; 4,954,587; 4,990,582; 5,010,141; 5,079,319; 5,310,779; 5,321,108; 5,358,995; 5,387,662; all of which are incorporated herein by reference. Examples of preferred hydrophilic monomers include both acrylic- and vinyl-containing monomers such as hydrophilic acrylic-, ethacrylic-, itaconic-, styryl-, acrylamido-, methacrylamido- and vinyl-containing monomers Preferred hydrophilic monomers may be either acrylic- or vinyl-containing. Such hydrophilic monomers may themselves be used as crosslinking agents. The term "vinyl-type" vinyl-containing monomers refers to monomers containing the vinyl grouping (CH$_2$=CQH), and are generally highly reactive. Such hydrophilic vinyl-containing monomers are known to polymerize relatively easily. "Acrylic-type" or "acrylic-containing" monomers are those monomers containing the acrylic group represented by the formula:

wherein X is preferably hydrogen or methyl and Y is preferably —O—, —OQ-, —NH—, —NQ- and —NH(Q)-, wherein Q is typically an alkyl or substituted alkyl group. Such monomers are known to polymerize readily.

Preferred hydrophilic vinyl-containing monomers which may be incorporated into the hydrogels of the present invention include monomers such as N-vinyllactams (e.g. N-vinylpyrrolidone (NVP)), N-vinyl-N-methylacetamide, N-vinyl-N-ethylacetamide, N-vinyl-N-ethylformamide, N-vinylformamide, with NVP being the most preferred.

Preferred hydrophilic acrylic-containing monomers which may be incorporated into the hydrogel of the present invention include hydrophilic monomers such as N,N-dimethylacrylamide (DMA), 2-hydroxyethyl methacrylate, glycerol methacrylate, 2-hydroxyethyl methacrylamide, methacrylic acid and acrylic acid, with DMA being the most preferred.

Suitable ethylenically unsaturated hydrophilic monomers include ethylenically unsaturated polyoxyalkylenes, polyacrylamides, polyvinylpyrrolidones, polyvinyl alcohols, poly(hydroxyethyl methacrylate) or poly (HEMA), and N-alkyl-N-vinylacetamides. Ethylenic unsaturation may be provided by (meth)acrylate, (meth)acrylamide, styrenyl, alkenyl, vinyl carbonate and vinyl carbamate groups. Preferred hydrophilic macromonomers include methoxypolyoxyethylene methacrylates of molecular weights from 200 to 10,000, more preferred are methoxypolyoxyethylene methacrylates of molecular weight range of 200 to 5,000 and most preferred are methoxypolyoxyethylene methacrylates of molecular weight range of 400 to 5,000. Additional preferred hydrophilic macromonomers include poly(N-vinylpyrrolidone) methacrylates of molecular weights of 500 to 10,000. More preferred are poly(N-vinylpyrrolidone methacrylates) of molecular weights of 500 to 5,000 and most preferred are poly(N-vinylpyrrolidone) methacrylates of molecular weights of 1000 to 5,000. Other preferred hydrophilic macromonomers include poly(N,N-dimethyl acrylamide methacrylates) of molecular weights of 500 to 10,000. More preferred are poly(N,N-dimethylacrylamide methacrylates) of molecular weights of 500 to 5,000 and most preferred are poly(N,N-dimethylacrylamide methacrylates) of molecular weights of 1000 to 5,000.

Suitable ethylenically unsaturated hydrophobic monomers include alkyl (meth)acrylates, N-alkyl (meth)acrylamides, alkyl vinylcarbonates, alkyl vinylcarbamates, fluoroalkyl (meth)acrylates, N-fluoroalkyl (meth)acrylamides, N-fluoroalkyl vinylcarbonates, N-fluoroalkyl vinylcarbamates, silicone-containing (meth)acrylates, (meth)acrylamides, vinyl carbonates, vinyl carbamates, styrenic monomers [selected from the group consisting of styrene, α-methyl styrene, ρ-methyl styrene, ρ-t-butylmonochlorostyrene, and ρ-t-butyldichlorostyrene] and poly[oxypropylene (meth)acrylates]. Preferred hydrophobic monomers include methyl methacrylate, dodecyl methacrylate, octafluoropentyl methacrylate, hexafluoroisopropyl methacrylate, perfluorooctyl methacrylate, methacryoyloxypropyltris(trimethylsiloxy)silane (TRIS).

When both an acrylic-containing monomer and a vinyl-containing monomer are incorporated into the invention, a further crosslinking agent having both a vinyl and an acrylic polymerizable group may be used, such as the crosslinkers which are the subject of U.S. Pat. No. 5,310,779, issued May 10, 1994, the entire content of which is incorporated by reference herein. Such crosslinkers help to render the resulting copolymer totally UV-curable. However, the copolymer could also be cured solely by heating, or with a combined UV and heat regimen. Photo and/or thermal initiators required to cure the copolymer will be included in the monomer mix, as is well-known to those skilled in the art. Other crosslinking agents which may be incorporated into the silicone-containing hydrogel including those previously described. Other techniques for increasing the wettability of compositions may also be used within the scope of the present invention, e.g. plasma surface treatment techniques which are well known in the art.

Particularly preferred hydrogel compositions comprise from about 0.1 to about 50 weight percent of functionalized poloxamers and/or poloxamines, from about 0.1 to about 30 weight percent of functionalized poloxamers and/or poloxamines, and from about 0.1 to about 4.9% weight percent of functionalized poloxamers and/or poloxamines. An advantage of using less than 5% of functionalized poloxamers and/or poloxamines is that the optical transmission of the device tends to decrease at higher concentrations of functionalized poloxamers and/or poloxamines.

The monomer mixes employed in this invention, can be readily cured to desired shapes by conventional methods such as UV polymerization, or thermal polymerization, or combinations thereof, as commonly used in polymerizing ethylenically unsaturated compounds. Representative free radical thermal polymerization initiators are organic peroxides, such as acetyl peroxide, lauroyl peroxide, decanoyl peroxide, stearoyl peroxide, benzoyl peroxide, t-butyl peroxypivalate, peroxydicarbonate, and the like, employed in a concentration of about 0.01 to 1 percent by weight of the total monomer mixture. Representative UV initiators are those known in the field such as, benzoin methyl ether, benzoin ethyl ether, Darocur 1173, 1164, 2273, 1116, 2959, 3331 (EM Industries) and Igracur 651 and 184 (Ciba-Geigy).

Polymerization of the end-functionalized poloxamers and/or poloxamines with other comonomers is generally performed (with crosslinking agents) in the presence of a diluent. The polymerization product will then be in the form of a gel. If the diluent is nonaqueous, the diluent must be removed from the gel and replaced with water through the use of extraction and hydration protocols well known to those of ordinary skill in the art. It is also possible to perform the polymerization in the absence of diluent to produce a xerogel. These xerogels may then be hydrated to form the hydrogels as is well known in the art.

In addition to the above-mentioned polymerization initiators, the copolymer of the present invention may also include other monomers as will be apparent to one of ordinary skill in the art. For example, the monomer mix may include colorants, or UV-absorbing agents such as those known in the contact lens art.

The present invention provides materials which can be usefully employed for the fabrication of prostheses such as heart valves and intraocular lenses, films, surgical devices, heart valves, vessel substitutes, intrauterine devices, membranes and other films, diaphragms, surgical implants, blood vessels, artificial ureters, artificial breast tissue and membranes intended to come into contact with body fluid outside of the body, e.g., membranes for kidney dialysis and heart/lung machines and the like, catheters, mouth guards, denture liners, ophthalmic devices, and especially contact lenses.

The polymers of this invention can be formed into ophthalmic devices by spincasting processes (such as those disclosed in U.S. Pat. Nos. 3,408,429 and 3,496,254), cast molding, lathe cutting, or any other known method for making the devices. Polymerization may be conducted either in a spinning mold, or a stationary mold corresponding to a desired shape. The ophthalmic device may be further subjected to mechanical finishing, as occasion demands. Polymerization may also be conducted in an appropriate mold or vessel to form buttons, plates or rods, which may then be processed (e.g., cut or polished via lathe or laser) to give an ophthalmic device having a desired shape.

When used in the formation of hydrogel (soft) contact lenses, it is preferred that the subject hydrogels have water contents of from about 20 to about 90 weight percent. Furthermore, it is preferred that such hydrogels have a modulus from about 20 $g/mm^2$ to about 150 $g/mm^2$, and more preferably from about 30 $g/mm^2$ to about 100 $g/mm^2$.

As an illustration of the present invention, several examples are provided below. These examples serve only to further illustrate certain aspects of the invention and should not be construed as limiting the invention.

EXAMPLES

Example 1

Synthesis of Functionalized Surfactants 6.00 of PLURONIC F127 was placed in a round bottom flask and dried thoroughly via azeotropic distillation of toluene (100 ml). The round bottom flask was then fitted with a reflux condenser and the reaction was blanketed with Nitrogen gas. Anhydrous tetrahydrofuran (THE) (60 ml) was added to the flask and the reaction was chilled to 5° C. with 15 equivalents (based upon the hydroxyl endgroups) of triethylamine (TEA) was added (2.0 ml). 1.4 ml of methacryoyl chloride (15 equivalents) was dropped into the reaction mixture through an addition funnel and the reaction mixture was allowed to warm to room temperature and then stirred overnight. The reaction mixture was then heated to 65° C. for 3 hours. Precipitated salt (TEA-HCl) was filtered from the reaction mixture and the filtrate was concentrated to a volume of around 355 mL and precipitated into cold heptane. Two further reprecipitations were performed to reduce the amount of TEA-HCl salt to less than 0.2% by weight. NMR analysis of the final polymer showed greater than 90% conversion of the hydroxyl endgroups to the methacrylated endgroups.

Example 2

Synthesis of Surfactant Epoxides 10.00 gins of PLURONIC F38 (2.13E-03 mol) are placed in a round bottom flask and dried thoroughly via azeotropic distillation of toluene and then dissolved in 100 mL of THF. 10 equivalents of solid NaH were added into the flask (0.51 gm; 2.13E-02 mol). Next 1.67 mL of epichlorohydrin (2.13E-03 mol) was added to the reaction mixture and mixed well and the reaction mixture was heated to reflux for 24 hours. The reaction mixture was cooled and a scoop of magnesium sulfate and silica gel was added to remove any water. Mixed well for 5 minutes and then filtered off the insolubles. Filtrate was concentrated to around 30 mL final volume and the product was precipitated into heptane and isolated by filtration. NMR confirms the presence of epoxide groups on the termini of the polymer Example 3

Purification of Functionalized Surfactants

Different PLURONICS and TETRONICS had to be purified by different techniques depending upon their ability to precipitate and their solubility in water. The purification technique used for each example is listed in the table below:

| # | | Mol. Wt. | % EO/HLB | Form | Method | Water Soluble |
|---|---|---|---|---|---|---|
| | Pluronics | | | | | |
| 1 | Pluronic F127 | 12,600 | 70/22 | solid | Prec/Dialysis | + |
| 2 | Pluronic P105 | 6,500 | 50/15 | paste | Dialysis | + |
| 3 | Pluronic P123 | 5,750 | 30/8 | paste | Dialysis | + |
| 4 | Pluronic F38 | 4,700 | 80/31 | solid | Prec/Dialysis | + |
| 5 | Pluronic L101 | 3,800 | 10/1 | liquid | Water/Centrifuge | − |
| 6 | Pluronic L121 | 4,400 | 10/1 | liquid | Water/Centrifuge | − |
| | Reverse Pluronics | | | | | |
| 7 | Pluronic 10R5 | 1,950 | 50/15 | liquid | Dialysis | + |
| 8 | Pluronic 31R1 | 3,250 | 10/1 | liquid | Water/Centrifuge | − |
| 9 | Pluronic 25R4 | 3,600 | 40/8 | paste | Dialysis | + |
| | Tetronics | | | | | |
| 10 | Tetronic 1107 | 15,000 | 70/24 | solid | Prec/Dialysis | + |
| 11 | Tetronic 904 | 6,700 | 40/15 | paste | Dialysis | + |
| 12 | Tetronic 908 | 25,000 | 80/31 | solid | Prec/Dialysis | + |
| 13 | Tetronic 1301 | 6,800 | 10/2 | liquid | Water/Centrifuge | − |
| | Reverse Tetronics | | | | | |
| 14 | Tetronic 150R1 | 8,000 | 10/1 | liquid | Water/Centrifuge | − |
| 15 | Tetronic 90R4 | 7,240 | 40/7 | liquid | Dialysis | + |
| | Other | | | | | |
| 16 | PEO | 10,000 | 100/>31 | solid | Prec/Dialysis | + |
| 17 | PPO | 3,500 | 0/<1 | liquid | Water/Centrifuge | − |

Method column refers to the method that can be used for purification of the resulting functionalized surfactant. Prec means that the polymer can be dissolved into Tetrahydrofuran (THF) and precipitated in hexane, with several reprecipitations leading to pure product (3x). Dialysis of the water soluble functionalized surfactant in 500-1000 molecular weight cut off dialysis tubing followed by freeze drying is a viable technique for purification of all water soluble PLURONICS and TETRONICS. Centrifuge means that functionalized surfactant is stirred in water and the water insoluble functionalized surfactant is then isolated by centrifugation and decanting off the top water layer. In the Water Soluble column, + means the functionalized surfactant is water-soluble and − means it is insoluble in water.

Examples 4-13

Synthesis of Polymeric Materials Comprising Functionalized Poloxamers and Poloxamines

| | | | | | Compound | | | | | | |
|---|---|---|---|---|---|---|---|---|---|---|---|
| Examples | Polymerizable Pluronic or Tetronic Macromer | 2-Hydroxy-ethyl methacrylate | V2D25 | M2D25 | Ethylene glycol dimethacrylate | Nonanol | Neo-pentylglycol methacrylate | Methyl-methacrylate | glycerin | Water | N-Vinyl Pyrolidone |
| 4 | 1.0[a] | x | x | 11.9 | x | x | x | x | 22.9 | x | x | 7.0 |
| 5 | 9.0[b] | 82.0 | x | x | x | x | x | x | x | x | x |
| 6 | 1.0[c] | 31.7 | x | x | 0.1 | x | x | x | 14.8 | x | 44.6 |
| 7 | 10.0[d] | x | x | x | x | x | x | x | x | 90.0 | x |
| 8 | 1.0[e] | x | 15.0 | x | x | 15.0 | x | x | x | x | 30.0 |
| 9 | 5.0[f] | 27.0 | x | x | 0.1 | x | x | x | 15.0 | x | 44.0 |
| 10 | 3.0[g] | 81.6 | x | x | 0.3 | x | x | x | 14.9 | x | x |
| 11 | 10.0[h] | x | x | x | 0.5 | x | x | x | 60.0 | x | 30.0 |
| 12 | 1.0[i] | x | x | 7.0 | x | x | x | x | x | x | x |
| 13 | 9.0[j] | x | x | x | x | x | x | x | x | x | 82.0 |

| | | | | | Compound | | | | | | |
|---|---|---|---|---|---|---|---|---|---|---|---|
| Examples | Hydroxyethyl methacrylate vinylcarbonate | Tris-Like Cross-linker | Vinal Acid | Initiator (i.e. DAROCUR, VAZO) | Hexafluoro-isopropyl methacrylate | Bishexa-fluoro-isopropyl iticonate | TRIS-VC | 2-hydroxy-cyclohexyl methacrylate | Methacrylic Acid | Neopentyl dimethacrylate | Tint (concentration in this column is in ppm) |
| 4 | x | 8.0 | x | 0.2 | x | 29.9 | x | x | 3.4 | 10.0 | 97 |
| 5 | x | x | x | x | x | x | x | 9.0 | x | x | x |
| 6 | 0.5 | x | x | 0.2 | x | x | x | 7.9 | x | x | 60 |
| 7 | x | x | x | 0.1 | x | x | x | x | x | x | x |

-continued

| 8 | x | x | 1.0 | 0.5 | x | x | 55.0 | x | x | x | 150 |
| 9 | x | x | x | x | x | x | x | 8.0 | x | x | 60 |
| 10 | x | x | x | 0.3 | x | x | x | x | x | x | 60 |
| 11 | x | x | x | x | x | x | x | x | x | x | x |
| 12 | x | 25.0 | x | 0.6 | 55.0 | x | x | x | 6.0 | 7.0 | 130 |
| 13 | x | x | x | x | x | x | x | 9.0 | x | x | x |

[a]= polymerizable Pluronic or Tetronic used has included F127-DM, F38-DM, and P105-DM.
[b]= polymerizable Pluronic or Tetronic used has included F127-DM, F38-DM, 10R5-DM, 25R4-DM, and T1107-DM
[c]= polymerizable Pluronic or Tetronic used has included F127-DM, F38-DM, P105-DM, P123-DM, L101-DM, L121-DM, 10R5-DM, 31R1-DM, 25R4-DM T1107-TM, T904-TM, T908-TM, T1301-TM, T150R1-TM, and T90R4-TM.
[d]= polymerizable Pluronic or Tetronic used has included F127-DM, P105-DM, F38-DM, 10R5-DM, T1107-TM, T904-TM, T908-TM, and T90R4-TM
[e]= polymerizable Pluronic or Tetronic used has included F127-DM, P123-DM, L121-DM, 10R5-DM, 31R1-DM, T1107-TM, T1301-TM, and T90R4-TM
[f]= polymerizable Pluronic or Tetronic would include F127-DM, P123-DM, and T1107-DM.
[g]= polymerizable Pluronic or Tetronic used has included F127-DM, P123-DM, L121-DM, 10R5-DM, and 31R1-DM
[h]= polymerizable Pluronic or Tetronic would include F127-DM, P105-DM, and L121-DM.
[i]= polymerizable Pluronic or Tetronic used has included F127-DM and P123-DM
[j]= polymerizable Pluronic or Tetronic used has included F127-DM, F38-DM, and P105-DM In the above examples the abbreviations used are described below, unless otherwise specified all numbers represent parts by weight:

Tint = Visibility tint

DAROCUR 1173-UV initiator

Vinal Acid-Aids in wetting

Nonanol-Diluent

V2D25-Silicon Macromonomer

M2D25-Silicon Macromonomer

NVP-Creates Hydrophilic Gel

-continued

TRIS-VC-Silicon Monomer

IMVT-visibility tint used in lens

Glycerin-Diluent

EGDMA-Crosslinker

HEMA-Creates Hydrophilic Gel

HEMA VC-Crosslinker

TBE-Increase Tear Strength

Several formulations were prepared as described in Examples 4-13. The sample formulations were cast between polypropylene molds or prepared as polymerized buttons that were then lathe cut to provide sample lenses.

Example 14

Surface Analysis of Pre- and Post-Sterilized Samples

Figure 1A:
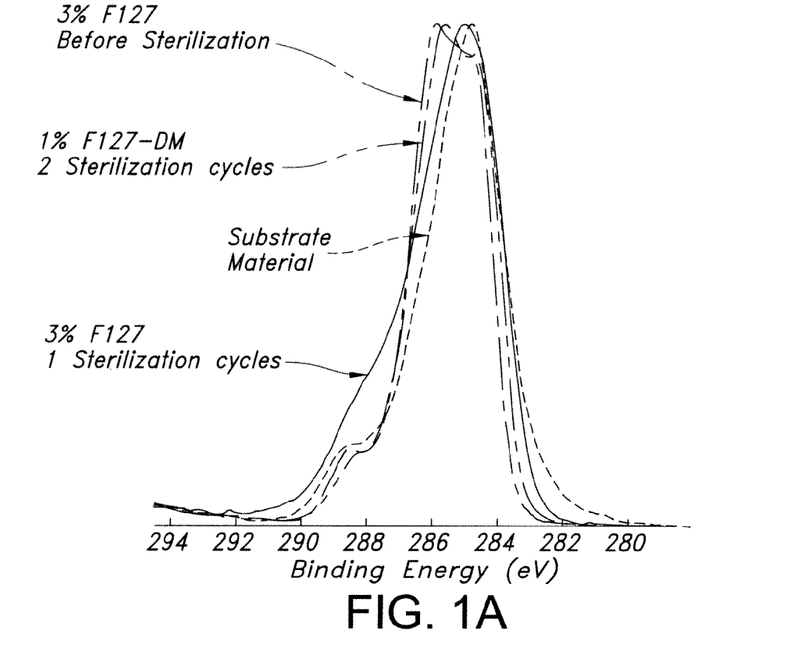
FIGS. 1a and 1b are X-ray photoelectron spectroscopy (XPS) spectra of a sample material prepared according to the invention.

The surface of contact lenses, prepared from some of the formulations disclosed as Examples 4-14 in the previous table, was examined using X-ray photoelectron spectroscopy (XPS) and Secondary Ion Mass Spectrometry (SIMS). Lenses were measured both before autoclave sterilization and after several sterilization cycles. As shown in FIG. 1a (Top), the broadening of the C1s peak in the XPS spectra (increase contribution of C—O) in the samples labelled 3% F127 before sterilization, and 1% F127-DM after 2 sterilization cycles demonstrating the presence of PLURONIC F127. It can also be seen that when the non-polymerizable F127 is used the contribution from C—O in the C1s spectra is diminished and reverts back to the original substrate.

Figure 1B:
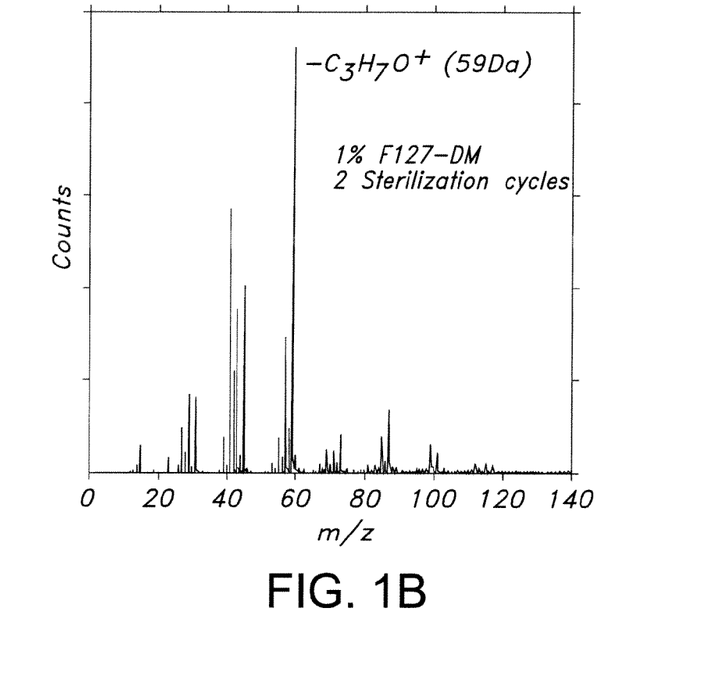
Figure 2:
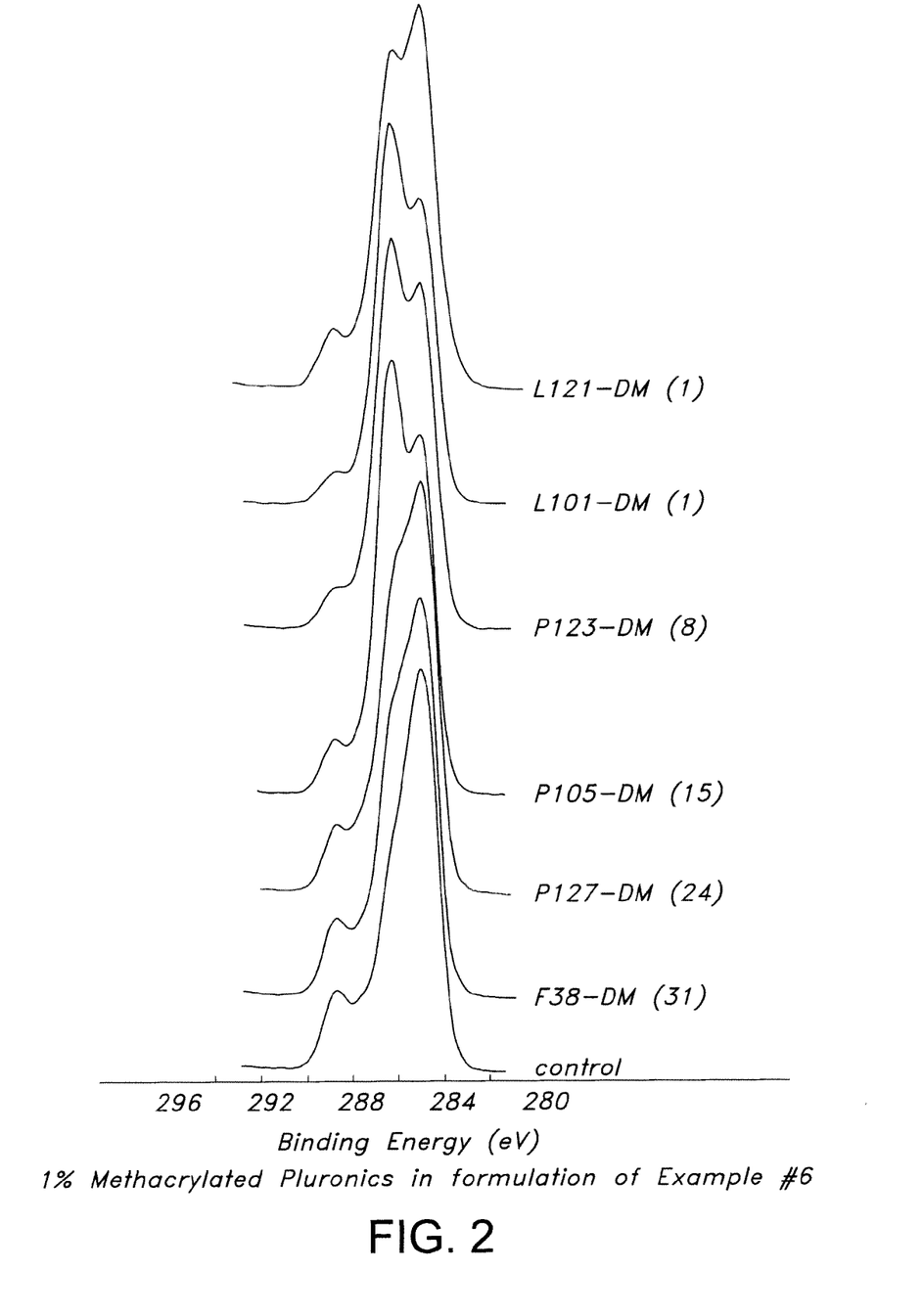
FIGS. 2 through 5 show the Carbon 1s (C1s) photoelectron region of the XPS spectra of a sample material prepared according to the invention.
Figure 3:
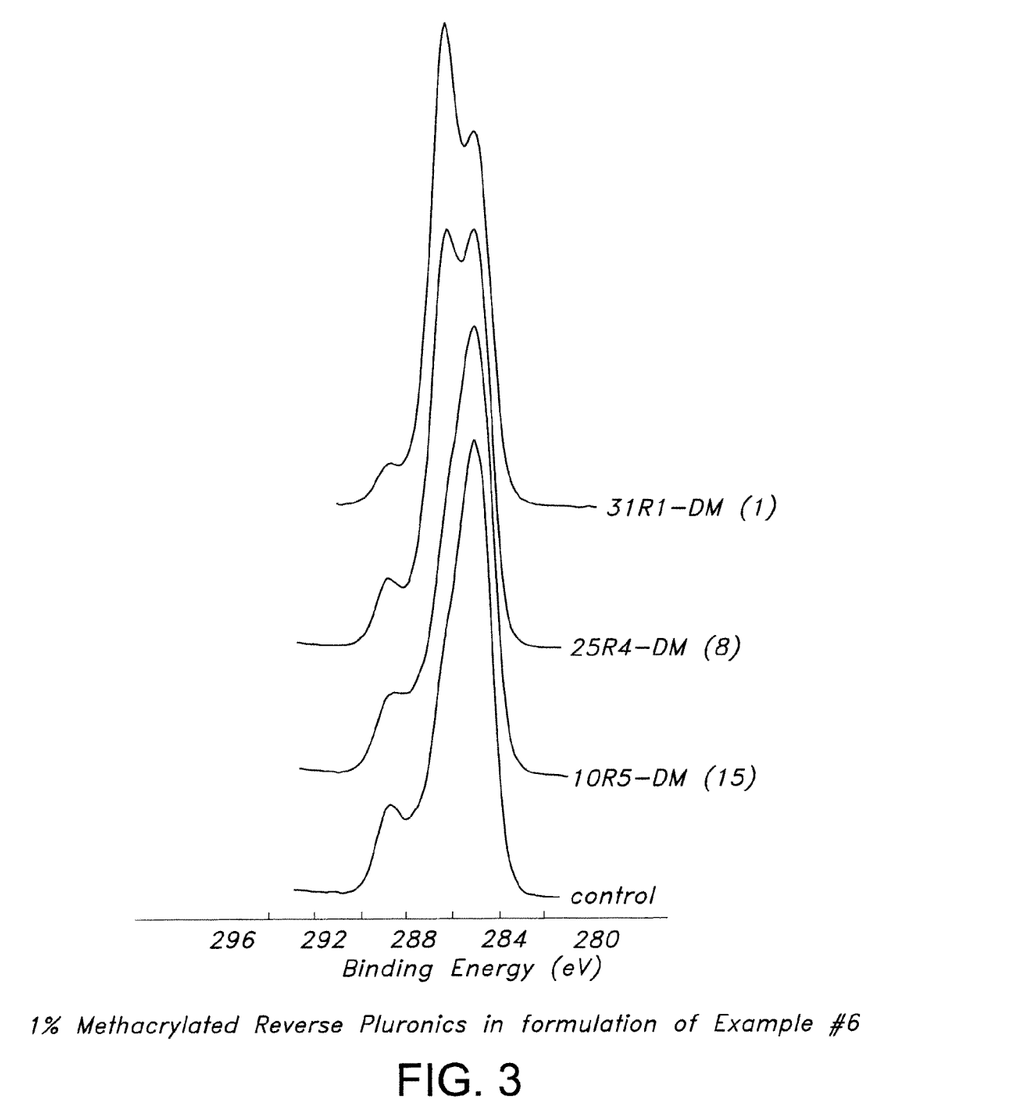
Figure 4:
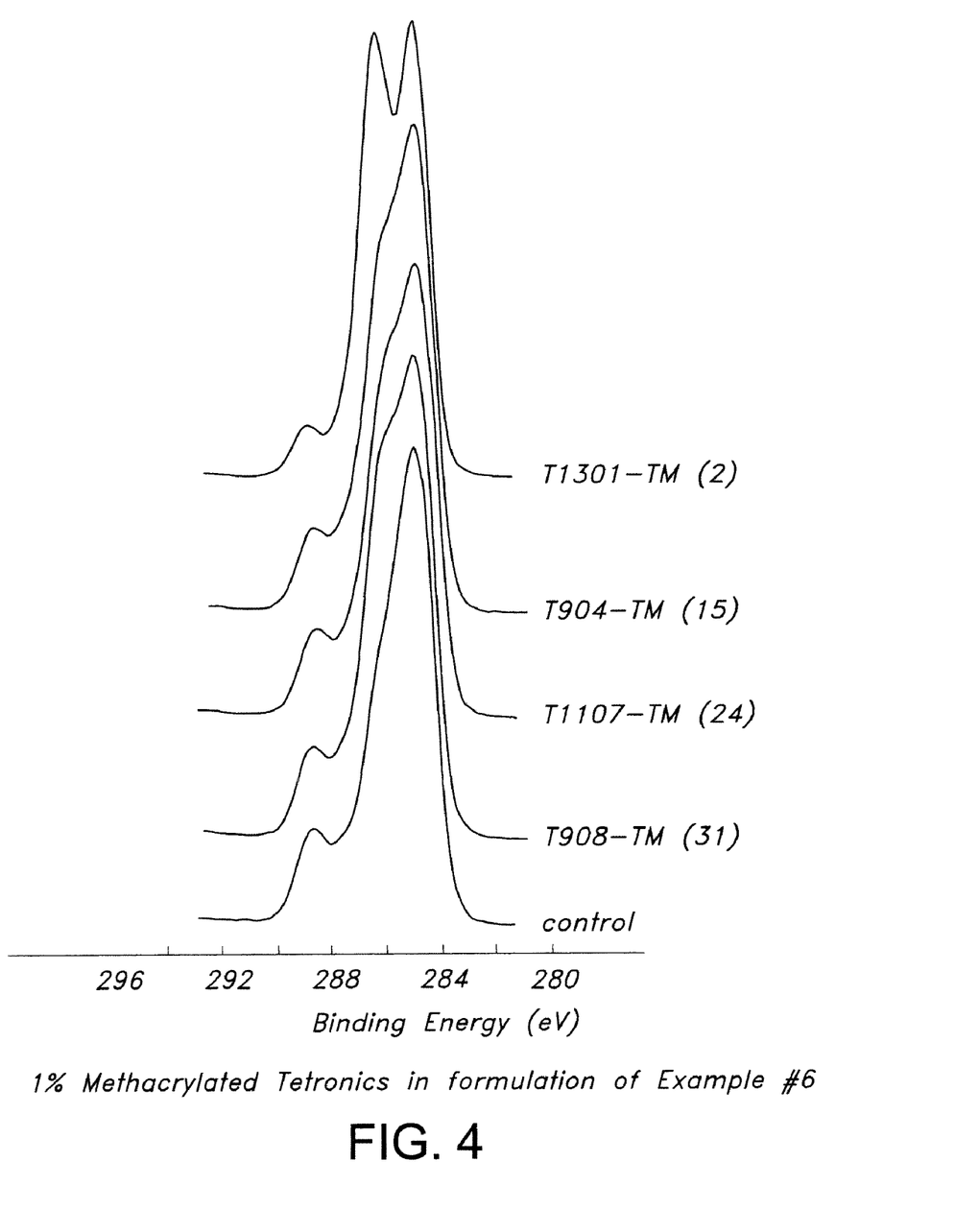
Figure 5:
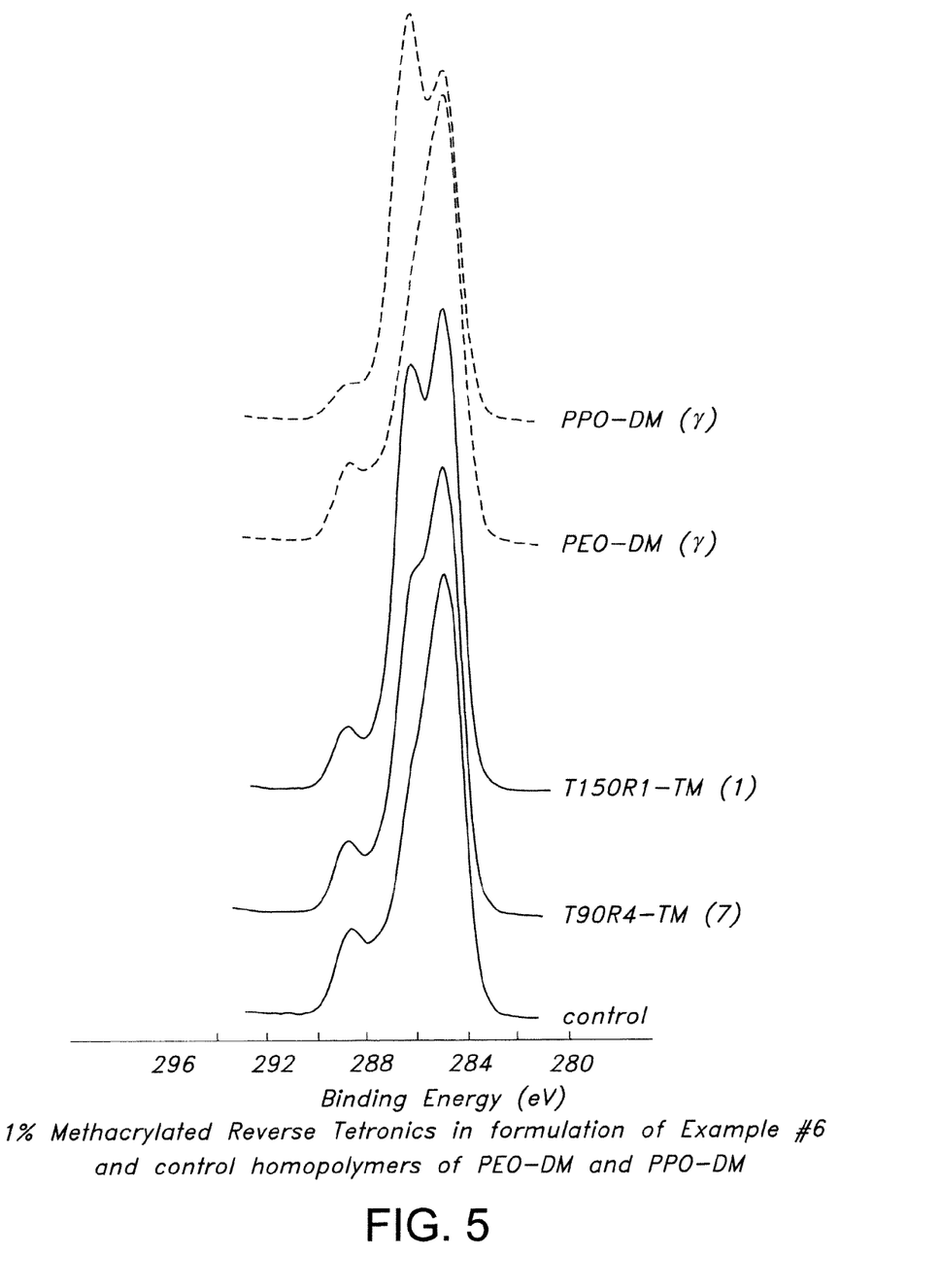

FIG. 1b (Bottom) shows the 59 Dalton peak in the SIMS spectra can also be used to confirm the presence of the functionalized PLURONIC in the material.

Further key results of these studies are summarized below:

1) In the dry state, the C—O dominates the carbon 1s photoelectron portion of the spectra for all the lenses pre-sterilized, showing that the PLURONIC or TETRONIC is detected by XPS.

2) When using the unmodified PLURONIC F127 as an additive, the lack of contribution from C—O in the XPS spectra indicates the F127 is no longer present after autoclave sterilization. (Spectrum reverts back to original hydrogel formulation without added F127) (See FIG. 1a).

3) Even after multiple sterilization cycles (2× autoclaving), the dimethacrylated PLURONIC (F 127-DM) was still present at the surface of the lens. (confirmed by XPS and SIMS). (See FIG. 1a)

Example 15

XPS Analysis of Entire Family of Modified PLURONIC and TETRONICS in a Lens Formulation Hydrogel lenses that had the modified PLURONICS and TETRONICS included in their formulations (disclosed as example 6 of the above table) were analyzed using XPS. Three sections from both the anterior surface (side of lens facing air) and the posterior surface (side of lens in contact with eye) were analyzed. The results are summarized in FIGS. 2 through 5, which show the Carbon 1s (C1s) photoelectron region of the XPS spectra. The HLB value for each surfactant shown is provided as the bracketed number next to the particular spectral trace.

The general trends evident in the C1s region are that the broadening of the peak demonstrates the presence of PLURONIC/TETRONIC by the enhanced contribution of C—O. As the HLB ratio is lowered there is an increase in the surface activity of the functionalized surfactants (greater concentration). From the survey data, as the HLB ratios of the added PLURONIC or TETRONIC are lowered, the nitrogen content is greatly reduced (and occasionally even masked) at the surface with a corresponding increase in C/N ratios. Taken together this demonstrates that the surface is greatly enriched with PLURONIC/TETRONIC (see FIGS. 2-5).

Example 16

Optical Transparency Study

Figure 6A:
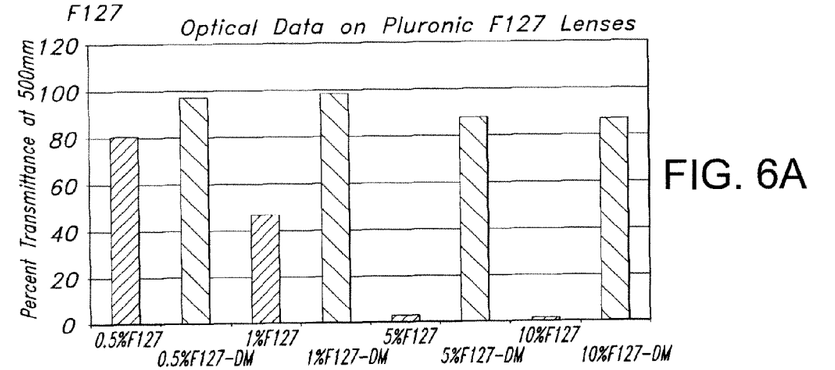
FIGS. 6-8 show the optical transparency measured at 500 nm (4 nm slit width) on a UV-Visible spectrophotometer for lenses containing both unmodified and modified PLURONICS and TETRONICS.
Figure 6B:
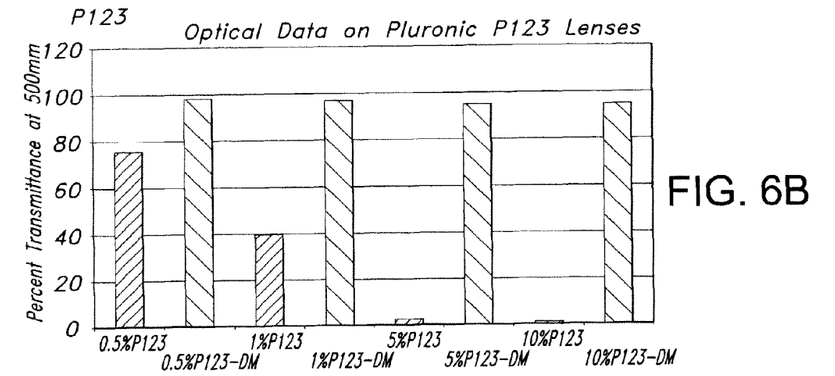
Figure 6C:
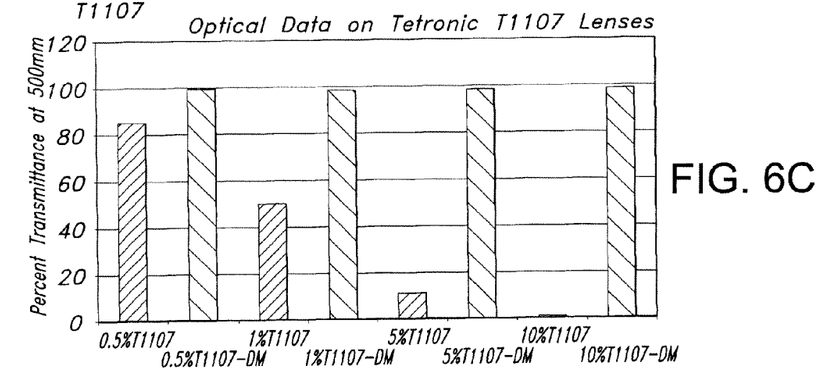
Figure 7A:
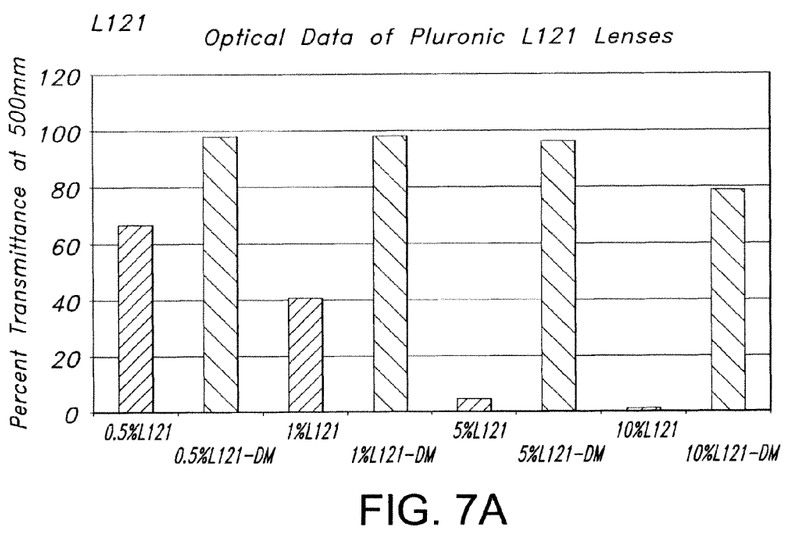
Figure 7B:
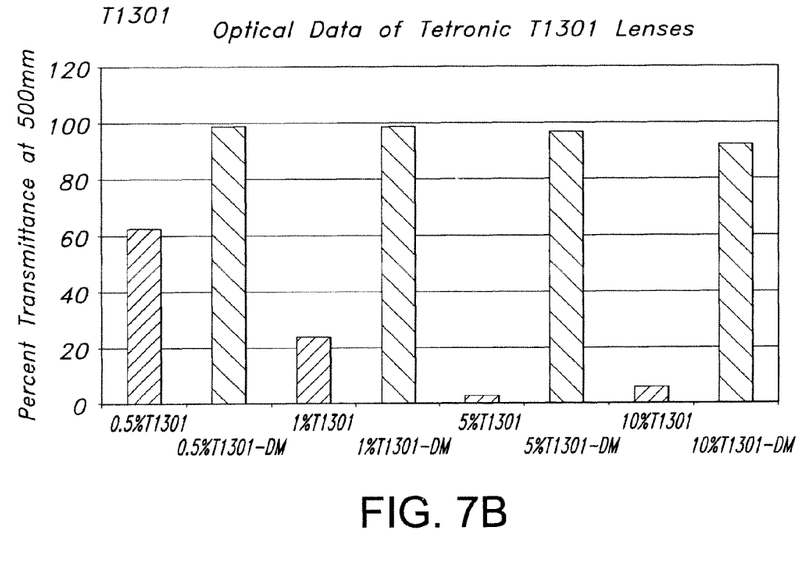
Figure 8A:
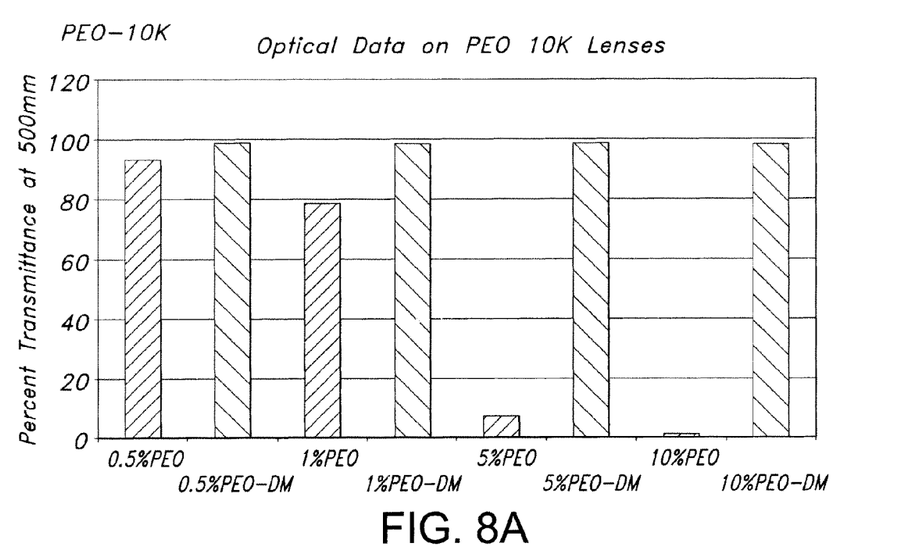
Figure 8B:
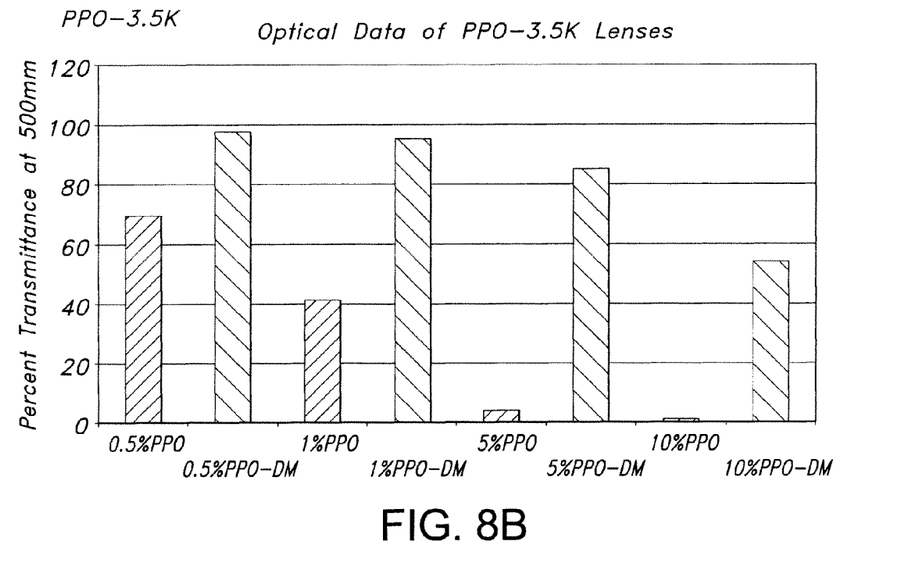

Using a hydrogel contact lens formulation, it was noted that when unmodified PLURONICS and TETRONICS were incorporated into the lens during polymerization, that upon hydration the lenses would become cloudy. This differed from their methacrylated counterparts that maintained optical clarity after hydration. The optical transparency was measured at 500 nm (4 nm slit width) on a UV-Visible spectrophotometer for lenses containing both unmodified and modified PLURONICS and TETRONICS and the results are shown in FIGS. 6 and 7. The PLURONICS and TETRONICS were incorporated at 0.5%, 1.0%, 5.0%, and 10% (weight percentages). As shown in FIGS. 6-8, in each case, the methacrylated versions (darker bars) maintained their optical clarity, while the unmodified polymers quickly caused clouding of the lenses (lighter bars).

Example 17

Effect of Adding Functionalized Surfactants on Mechanical Properties

Figure 9A:
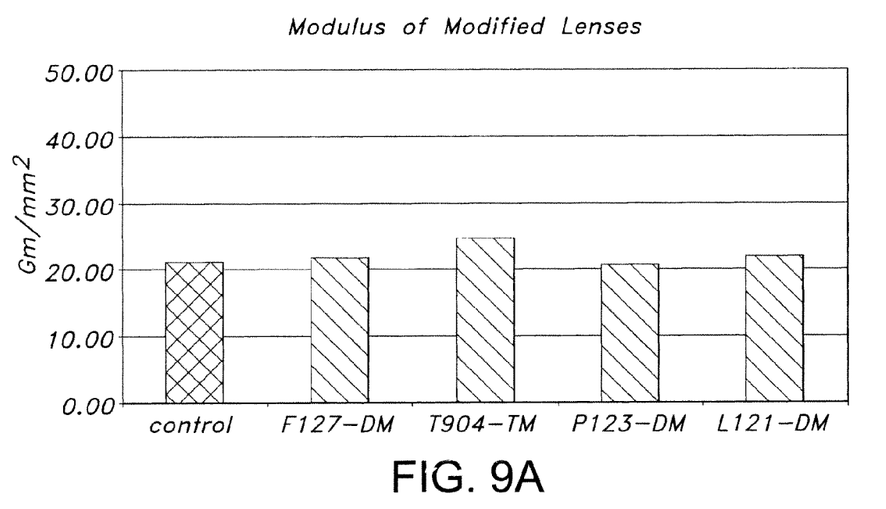
FIG. 9 shows the effect of adding a functionalized surfactant to the lens formulation on the modulus or tear strength of the resulting lens.
Figure 9B:
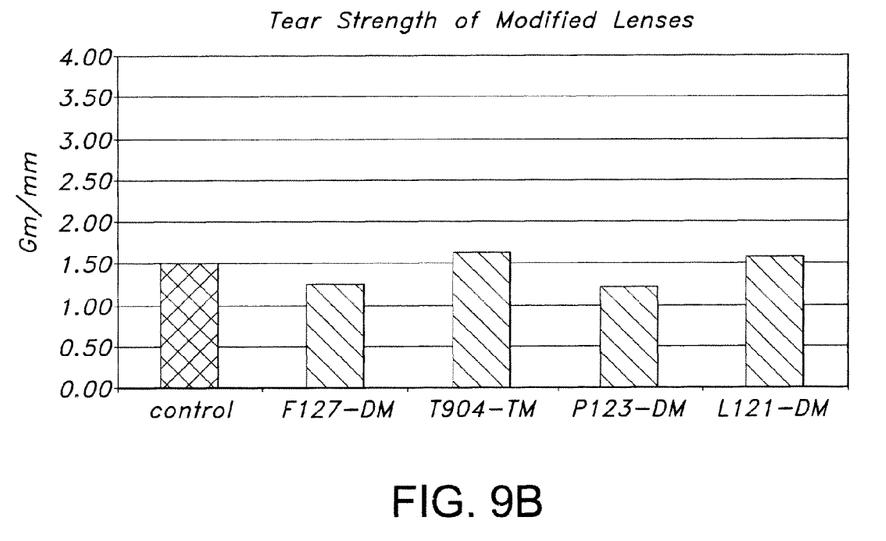

In order to determine if there was an effect of adding a functionalized surfactant to the lens formulation on the modulus or tear strength of the resulting lens, 5 lots of lenses were submitted for analysis. These included one control lot and four lots with 1% by weight of an added functionalized surfactant. (F127-DM; T904-TM; P123-DM; and L121-DM) Ten measurements for each lot were run for both tear strength and modulus and the results are shown below. As shown in FIG. 9, within statistical error there was no real change in the modulus or tear strength of the lenses upon addition of 1 weight % of functionalized surfactant.

The above examples are intended to illustrate but not limit certain embodiments of the invention as described in the claims attached hereto. For example, other comonomers that can be added to the polymerizable surfactant comonomer mixtures would be obvious to one of skill in the art. Also, as additional ophthalmic devices are developed it would be expected that polymerizable surfactants will also be useful in other ophthalmic devices.

What is claimed is:

1. An ophthalmic device comprising:
a polymerized comonomer mixture comprising at least one polymerizable surfactant selected from the group consisting of a poloxamer di(meth)acrylate, a reverse poloxamer di(meth)acrylate, a poloxamine di(meth)acrylate, a reverse poloxamine di(meth)acrylate and mixtures thereof, wherein the at least one polymerizable surfactant is present in the comonomer mixture prior to polymerization in an amount of about 0.1 to about 4.9 weight percent, and further wherein the ophthalmic device is a contact lens, an intraocular lens or a corneal implant, wherein the ophthalmic device has a water content of from about 20 to about 90 weight percent.

2. A hydrogel contact lens comprising:
a polymerized comonomer mixture comprising at least one polymerizable surfactant selected from the group consisting of a poloxamer di(meth)acrylate, a reverse poloxamer di(meth)acrylate, a poloxamine di(meth)acrylate, a reverse poloxamine di(meth)acrylate and mixtures thereof, wherein the at least one polymerizable surfactant is present in the comonomer mixture prior to polymerization in an amount of about 0.1 to about 4.9 weight percent, and further wherein the ophthalmic device is a contact lens, an intraocular lens or a conical implant, wherein the ophthalmic device has a modulus from about 20 $g/mm^2$ to about 150 $g/mm^2$.

3. A hydrogel contact lens comprising:
a polymerized comonomer mixture comprising at least one polymerizable surfactant selected from the group consisting of a poloxamer di(meth)acrylate, a reverse poloxamer di(meth)acrylate, a poloxamine di(meth)acrylate, a reverse poloxamine di(meth)acrylate and mixtures thereof, wherein the at least one polymerizable surfactant is present in the comonomer mixture prior to polymerization in an amount of about 0.1 to about 4.9 weight percent, and further wherein the ophthalmic device is a contact lens, an intraocular lens or a corneal implant, wherein the ophthalmic device has a modulus of from about 30 $g/mm^2$ to about 100 $g/mm^2$.

* * * * *